United States Patent [19]
Sumida et al.

[11] Patent Number: 5,972,074
[45] Date of Patent: Oct. 26, 1999

[54] METHOD FOR REDUCING IMPURITIES IN MISCH METAL AND ALLOYS

[75] Inventors: Hiroshi Sumida; Yoshiyuki Komatsu; Masao Hidaka, all of Takehara, Japan

[73] Assignee: Mitsui Mining & Smelting Company, Ltd., Japan

[21] Appl. No.: 08/889,519

[22] Filed: Jul. 8, 1997

[30] Foreign Application Priority Data

Jul. 19, 1996 [JP] Japan .................................. 8-190352

[51] Int. Cl.$^6$ .................................................. C22B 59/00
[52] U.S. Cl. ........................... 75/610; 420/416; 420/590; 429/49
[58] Field of Search ............................... 75/610; 420/416, 420/590; 429/49

[56] References Cited

U.S. PATENT DOCUMENTS

| 1,023,208 | 4/1912 | Lesmuller | 420/416 |
| 5,174,811 | 12/1992 | Schmidt et al. | 75/610 |

*Primary Examiner*—Melvyn Andrews
*Attorney, Agent, or Firm*—Bierman, Muserlian and Lucas

[57] ABSTRACT

A method for reducing Carbon contained in hydrogen storage alloys recovered from negative electrodes of nickel/hydrogen storage alloy secondary batteries of misch metal and alloys thereof as raw materials of hydrogen storage alloys for negative electrodes of nickel/hydrogen secondary batteries by adding titanium or zirconium or oxides of these elements, and melting in an inert gas atmosphere or in vacuum.

11 Claims, No Drawings

METHOD FOR REDUCING IMPURITIES IN MISCH METAL AND ALLOYS

FIELD OF THE INVENTION

A method for recovering and recycling useful ingredients from negative electrodes of nickel/hydrogen storage alloy secondary batteries in the state of a metal at low cost, rather than through a wet process by acid dissolution, and to a method for reducing impurities in a misch metal and its alloys to make raw misch metal and its alloys containing a large amount of impurities to be usable as raw materials for hydrogen storage alloys for secondary batteries.

STAGE OF THE ART

Nickel/hydrogen storage alloy secondary batteries using hydrogen storage alloys based on rare earth metals are widely used for their high energy density, and since their active substances use rare metals such as rare earth metals, cobalt, and nickel, recovery and recycling of these rare metals is being required.

In particular, since the nickel/hydrogen storage alloy batteries are looked upon with promise as a main type of electric car batteries which are being considered as one of the measures for global environment protection, recovery and recycling of rare metals contained in the batteries is essential.

When, in a prior art process of melting by induction heating or the like in an inert gas atmosphere, by melting alloys from negative electrodes of these decommissioned batteries for recovering useful ingredients as metals, alloys separated and recovered from decommissioned negative electrodes contain large amounts of carbon and organic substances added in the production of the batteries, which impurities are difficult to remove by a conventional physical separation method and reduce the carbon content. Further, if the materials are remelted without removing the carbon and organic substances, the carbon is fixed in the alloys. Both cases have problems in that high purity alloys cannot be obtained which can be reused as raw materials for hydrogen storage alloys for batteries.

As a method for recovering ingredients from nickel/hydrogen storage batteries, there has been developed a method in which active substances of the pole plates are dissolved by an acid such as sulfuric acid, nitric acid, or hydrochloric acid to obtain an aqueous solution and ingredients such as cobalt, nickel, rare earths, and the like are recovered. However, since such a method is not low in recovery cost, the method is not suitable for commercial application other than for some expensive metals.

Further, although raw materials used in the hydrogen storage alloys for negative electrodes of nickel/hydrogen storage alloy secondary batteries include a variety of metals such as misch metal, nickel, and cobalt, these materials have problems in that it is difficult to obtain inexpensive and pure raw materials, and inexpensive materials cannot be used to maintain low impurity contents of the alloys.

Yet further, if raw materials containing large amounts of impurities are used for the production of hydrogen storage alloys of negative electrodes of nickel/hydrogen storage alloy secondary batteries, the resulting alloys include large amounts of impurities and do not provide necessary characteristics as hydrogen storage alloys used in nickel/hydrogen storage alloy secondary batteries.

OBJECTS OF THE INVENTION

An object of the present invention is to provide a method for recovering and recycling negative electrode alloys from decommissioned nickel/hydrogen storage alloy secondary batteries as high purity raw material metals that can be used as raw materials for hydrogen storage alloys for secondary batteries by a simple and inexpensive process. It is another object of the invention to provide a method for reducing impurities in a misch metal and its alloys containing a large amount of impurities which could not be used by the prior art as raw materials of nickel/hydrogen storage alloy secondary batteries, to be usable as raw materials for hydrogen storage alloys for secondary batteries.

SUMMARY OF THE INVENTION

As a result of a intensive studies for a process which can apply conventional technology, and is low-cost and efficient, a method for removing impurities from alloys recovered from decommissioned negative electrodes and containing large amounts of impurities to obtain high purity raw material alloys that can be used as hydrogen storage alloys for negative electrodes of nickel/hydrogen storage alloy secondary batteries, without using a wet process has been formed.

In accordance with the present invention, which attains the above object, there is provided a first method for reducing impurities in a misch metal and alloys thereof characterized in that titanium or zirconium or oxides thereof are added and melted in an inert gas atmosphere or in vacuum, thereby reducing carbon contained in hydrogen storage alloys from negative electrodes of nickel/hydrogen storage secondary batteries or in the misch metal and alloys thereof as raw materials for hydrogen storage alloys for negative electrodes for nickel/hydrogen storage alloy secondary batteries.

There is also provided according to the present invention a second method for reducing impurities in a misch metal and alloys thereof characterized in that carbon contained in recovered hydrogen storage alloys or a misch metal and alloys thereof is reacted with a decarbonizing agent added to be concentrated as a carbide in a slug, whereby reducing a carbon content of the alloys.

There is further provided according to the present invention a third method for reducing impurities in a misch metal and alloys thereof based on the first method, wherein titanium is added in an amount of two times or more by weight, based on the amount of carbon contained in the recovered hydrogen storage alloys or misch metal and alloys thereof to be decarbonized.

There is still further provided according to the present invention a fourth method for reducing impurities in a misch metal and alloys thereof based on the first method, wherein titanium oxide is added in an amount of 2 to 20 times by weight, based on the amount of carbon contained in the recovered hydrogen storage alloys or misch metal and alloys thereof to be decarbonized.

There is yet further provided according to the present invention a fifth method for reducing impurities in a misch metal and alloys thereof based on the first method, wherein zirconium is added in an amount of two times or more by weight, based on the amount of carbon contained in the recovered hydrogen storage alloys or misch metal and alloys thereof to be decarbonized.

There is yet further provided according to the present invention a sixth method for reducing impurities in a misch metal and alloys thereof based on the first method, wherein zirconium oxide is added in an amount of 3 to 30 times by weight, based on the amount of carbon contained in the recovered hydrogen storage alloys or misch metal and alloys thereof to be decarbonized.

There is yet further provided according to the present invention a seventh method for reducing impurities in a misch metal and alloys thereof based on the third method, wherein the titanium added is sponge titanium.

There is yet further provided according to the present invention an eighth method for reducing impurities in a misch metal and alloys thereof based on the fourth method, wherein the titanium oxide added is of the anatase type.

There is yet further provided according to the present invention a ninth method for reducing impurities in a misch metal and alloys thereof based on the first method, wherein when the recovered hydrogen storage alloys to be decarbonized are in the form of a powder, the alloys are formed into a cluster before melting, and titanium or zirconium or oxides of these elements as a decarbonizing agent is previously added at the time of cluster formation.

There is yet further provided according to the present invention a tenth method for reducing impurities in a misch metal and alloys thereof based on the first method, wherein melting is performed at a temperature 50 to 300° C. higher than the melting point of the recovered hydrogen storage alloys or the misch metal and alloys thereof to be decarbonized.

There is yet further provided according to the present invention an eleventh method for reducing impurities in a misch metal and alloys thereof based on the first method, wherein the decarbonization is performed in an atmosphere of argon.

DETAILED DESCRIPTION OF THE INVENTION

Operation of the present invention will be described below.

In the method for reducing impurities according to the present invention, when the material to be decarbonized is a hydrogen storage alloy powder recovered from decommissioned negative electrodes of nickel/hydrogen storage alloy secondary batteries, the powder is briquetted by a press, recovered hydrogen storage alloy, or misch metal or alloys thereof are mixed with a predetermined amount of titanium or zirconium or oxides thereof as a decarbonizing agent, and the mixture is placed in a crucible. The melting crucible can be made of alumina, magnesia, or zirconia.

The decarbonizing agent, in the case of titanium, may be mixed in an amount of two times or more by weight of carbon contained in a metal to be decarbonized. To the case of titanium oxide, the decarbonizing agent may be mixed in an amount of 2 to 20 times by weight of carbon contained in the metal to be decarbonized.

Further, when the decarbonizing agent is zirconium, it may be mixed in an amount of two times or more by weight of carbon contained in the metal to be decarbonized. When the decarbonizing agent is zirconium oxide, it may be mixed in an amount of 3 to 30 times by weight of carbon contained in the metal to be decarbonized.

When the material to be decarbonized is a hydrogen storage alloy powder recovered from decommissioned negative electrodes of nickel/hydrogen storage alloy secondary batteries, the decarbonizing agent may be mixed after briquetting the recovered hydrogen storage alloy powder. However, it is preferable to be previously mixed at the time of briquetting the recovered hydrogen storage alloy powder.

The predetermined amount of decarbonizing agent is added to the metal to be decarbonized, and melted in an atmosphere of argon or other inert gas or in vacuum at a temperature 50 to 300° C. higher than the melting point of the metal.

The molten mixture in the crucible is cooled, separated into an alloy portion and a slug portion, and the alloy is recovered as an ingot. The above separation can be achieved by pouring the content of the crucible into molds such as a water-cooled mold or the like.

The alloy or metal recovered by the atmospheric melting or vacuum melting is reduced in carbon content, and can be returned, as is, to the production process as a raw alloy material for nickel/hydrogen storage alloy secondary batteries.

It is also possible to carry out the alloy production and decarbonization simultaneously by subjecting the metal to be decarbonized and the predetermined amount of the decarbonizing agent to the production process of the alloys for the nickel/hydrogen storage alloy secondary batteries.

By the above-described process, carbon content can be reduced in hydrogen storage alloys recovered from decommissioned negative electrodes of nickel/hydrogen storage alloy secondary batteries, or misch metal or alloys thereof containing large amounts of impurities.

In the present invention, a sample press-formed into a briquette of the hydrogen storage alloy powder recovered from decommissioned negative electrodes of nickel/hydrogen storage alloy secondary batteries, or the misch metal or alloys thereof containing large amounts of impurities is mixed with a predetermined amount of metal or oxide thereof as a decarbonizing agent, the mixture is placed in a crucible made of ceramics such as alumina, magnesia, zirconia, or the like, and melted by a high-frequency induction heating smelting furnace or a resistance heating smelting furnace in an inert gas atmosphere such as argon or in vacuum.

The decarbonizing agent in this case, when the metal to be decarbonized is a hydrogen storage alloy powder recovered from decommissioned negative electrodes of nickel/hydrogen storage alloy secondary batteries, may be mixed with the alloy powder after briquetting. However, it is more preferable that a predetermined amount of the agent is previously mixed in the alloy powder before briquetting.

As the decarbonizing agent in this method, titanium, zirconium, titanium oxide, or zirconium oxide is effective. For the case of titanium, it may be mixed in an amount of two times or more by weight of carbon contained in the metal to be decarbonized. For the case of zirconium, it may be mixed in an amount of two times or more by weight of carbon contained in the metal to be decarbonized and for the case of titanium oxide, it may be mixed in an amount of 2 to 20 times by weight of carbon contained in the metal to be decarbonized. For the case of zirconium oxide, it may be mixed in an amount of 3 to 30 times by weight of carbon contained in the metal to be decarbonized.

In the above-described cases, when the decarbonizing agent is an oxide, if an amount of the decarbonizing agent larger than specified is added, an increased amount of slug is generated in the melting process for performing the decarbonization, and the viscosity of the slug is increased, resulting in deteriorated separation from the metal to be decarbonized, which is not preferable. Further, if the decarbonizing agent is less than the amount specified, sufficient decarbonization effect cannot be obtained.

When titanium is used as a decarbonizing agent, use of sponge titanium is preferable, and when titanium oxide is used as a decarbonizing agent, anatase type titanium oxide is preferably used as it is higher in decarbonization effect.

The crucible containing the metal to be decarbonized and the decarbonizing agent are heated in an inert gas atmosphere or in vacuum at a temperature 50 to 300° C. higher than the melting point of the alloy to melt the content of the crucible, and the melting temperature is maintained for 0.1 to 4 hours.

After that, the crucible is cooled and the content of the crucible is separated into the alloy portion and the upper slug portion to recover the alloy. Separation of the alloy and slug can be achieved by pouring the content of the crucible in the molten state into a mold such as a water-cooled mold or the like. In this case, the alloy separated from the slug is recovered from the mold after it is cooled.

The recovered hydrogen storage alloys, or misch metal and alloys thereof removed of carbon by the present method have a carbon content to an extent that they can be used as materials for nickel/hydrogen storage alloy secondary batteries.

EXAMPLES

Preferred examples of the present invention will be described, however, the present invention is not limited to the examples.

Example 1

A briquetted negative alloy recovered from decommissioned nickel/hydrogen storage alloy secondary batteries in an amount of 500 g (C amount: about 3.3 g), and 20 g (about 6 times the C amount) of sponge titanium were mixed, charged into an alumina crucible and placed in a resistance heating furnace. The furnace was evacuated by a rotary pump to 0.1 torr, and then argon gas was introduced into the furnace to 500 mmHg. The crucible was heated to 1500° C., maintained at this temperature for 1 hour, and then cooled in the furnace. After cooling to room temperature, the crucible was taken out and disassembled to obtain 465 g of alloy and 60 g of slug from the content. Analytical results of the alloy powder using the recovered alloys as a raw material are shown in Table 1.

Example 2

A briquetted negative alloy recovered from decommissioned nickel/hydrogen storage alloy secondary batteries in an amount of 4,000 g (C amount: about 26 g), and 100 g (about 3.8 times the C amount) of anatase type titanium oxide were mixed, charged into an alumina crucible and placed in a high frequency induction heating furnace. The furnace was evacuated by a rotary pump to 0.1 torr, and then, argon gas was introduced into the furnace to 500 mmHg. The crucible was heated to 1,500° C., maintained at this temperature for 2 hours, and the content was poured into a water-cooled mold which was previously provided in the furnace, and cooled.

After cooling, 3,750 g of alloy were recovered from the mold, and 295 g of slug were not poured out, but remained in the crucible, Analytical results of the alloy powder using the recovered alloys as a raw material are shown in Table 2.

Example 3

A misch metal containing 0.4% carbon in an amount of 2,500 g (C amount: about 10 g) and 105 g (about 10 times the C amount) of zirconium oxide powder were mixed, charged into an alumina crucible and placed in a high frequency induction heating furnace. The furnace was evacuated by a rotary pump to 0.1 torr, and then argon gas was introduced into the furnace to 500mmHg. The crucible was heated to 1,000° C. maintained at this temperature for 2 hours, and the content was poured in a water-cooled mold which was previously provided in the furnace, and cooled.

After cooling, 2,350 g of alloy were recovered from the mold, and 250 g of slug were not poured out but remained in the crucible. Analytical results of the misch metal using the decarbonized sample as a raw material are shown in Table 3.

TABLE 1

<Analytical results of Example 1>

| | La | Ce | Pr | Nd | Ni | Co | Mn | Al | C | Ti |
|---|---|---|---|---|---|---|---|---|---|---|
| Recovered alloy powder before melting | 10.3 | 15.1 | 1.4 | 4.6 | 50.2 | 9.6 | 5.1 | 1.9 | 0.65 | <0.01 |
| Recovered alloy after melting | 10.1 | 14.7 | 1.3 | 4.4 | 51.8 | 9.9 | 5.2 | 1.9 | 0.08 | 0.02 |

(in %)

TABLE 2

<Analytical results of Example 2>

| | La | Ce | Pr | Nd | Ni | Co | Mn | Al | C | Ti |
|---|---|---|---|---|---|---|---|---|---|---|
| Recovered alloy powder before melting | 10.3 | 15.1 | 1.4 | 4.6 | 50.2 | 9.6 | 5.1 | 1.9 | 0.65 | <0.01 |
| Recovered alloy after melting | 10.1 | 14.9 | 1.4 | 4.5 | 50.9 | 9.9 | 5.3 | 1.9 | 0.11 | 0.02 |

(in %)

TABLE 3

<Analytical results of Example 3>

| | La | Ce | Pr | Nd | C | Zr |
|---|---|---|---|---|---|---|
| Misch metal before melting | 27.3 | 50.1 | 5.8 | 15.8 | 0.65 | <0.01 |
| Misch metal after melting | 27.5 | 50.3 | 5.7 | 15.4 | 0.05 | 0.02 |

(in %)

Comparative Example

When, without adding sponge titanium as the decarbonizing agent, melting was carried out using the same condition as in Example 1, analytical results of the recovered alloy are shown in Table 4. Further, when without adding titanium oxide, melting was carried out using the same condition as in Example 2, analytical results of the recovered alloy are shown in Table 5.

As can be seen from Tables 4 and 5, in both cases, when sponge titanium or titanium oxide was not added, almost no reduction was noted in carbon content of the recovered alloy.

TABLE 4

<Analytical results of Comparative Example of Example 1>

| | La | Ce | Pr | Nd | Ni | Co | Mn | Al | C | Ti |
|---|---|---|---|---|---|---|---|---|---|---|
| Recovered alloy powder before melting | 10.3 | 15.1 | 1.4 | 4.6 | 50.2 | 9.6 | 5.1 | 1.9 | 0.65 | <0.01 |
| Without using decarbonizing agent | 10.2 | 15.0 | 1.4 | 4.6 | 50.9 | 9.8 | 5.2 | 1.9 | 0.51 | <0.01 |

(in %)

TABLE 5

<Analytical results of Comparative Example of Example 2>

| | La | Ce | Pr | Nd | Ni | Co | Mn | Al | C | Ti |
|---|---|---|---|---|---|---|---|---|---|---|
| Recovered alloy powder before melting | 10.3 | 15.1 | 1.4 | 4.6 | 50.2 | 9.6 | 5.1 | 1.9 | 0.65 | <0.01 |
| Without using de-carbonizing agent | 10.3 | 14.8 | 1.4 | 4.6 | 50.6 | 9.7 | 5.0 | 1.9 | 0.55 | <0.01 |

(in %)

Various modifications of the process of the invention may be made without departing from the spirit or scope thereof and it is to be understood that the invention is intended to be limited only as defined in the appended claims.

What is claimed is:

1. A method of reducing impurities from misch metal or alloys thereof used as negative electrodes for hydrogen storage and containing impurities including carbon comprising adding to said misch metal or alloys thereof at least one member of the group consisting of titanium, zirconium and oxides thereof to form a mixture and melting the resulting mixture in an inert atmosphere or in a vacuum to reduce the carbon content by forming titanium carbide or zirconium carbide.

2. The method of claim 1 wherein the metal carbide formed is removed as a slug.

3. The method for reducing impurities of claim 1, wherein titanium is added in an amount of at least two times by weight based on the amount of carbon contained in the hydrogen storage alloys or misch metal and alloys thereof to be decarbonized.

4. The method for reducing impurities of claim 1, wherein titanium oxide is added in an amount of 2 to 20 times by weight based on the amount of carbon contained in the hydrogen storage alloys or misch metal and alloys thereof to be decarbonized.

5. The method for reducing impurities of claim 1, wherein zirconium is added in an amount of at least two times by weight based on the amount of carbon contained in the hydrogen storage alloys or misch metal and alloys thereof to be decarbonized.

6. The method for reducing impurities of claim 1, wherein zirconium oxide is added in an amount of 3 to 30 times by weight based on the amount of carbon contained in the hydrogen storage alloys or misch metal and alloys thereof to be decarbonized.

7. The method for reducing impurities of claim 3, wherein the titanium added is sponge titanium.

8. The method for reducing impurities of claim 4, wherein the titanium oxide added is anatase.

9. The method for reducing impurities of claim 1, wherein when the hydrogen storage alloy to be decarbonized is in the form of a powder, the alloy is formed into a briquette before melting, and titanium or zirconium or oxides of these elements as a decarbonizing agent is added before the time of said briquette formation.

10. The method for reducing impurities of claim 1, wherein melting is performed at a temperature 50 to 300° C. higher than the melting point of hydrogen storage alloys of the misch metal and alloys thereof to be decarbonized.

11. The method for reducing impurities of claim 1, wherein said melting is performed in an argon atmosphere.

* * * * *